(12) United States Patent
Kimura

(10) Patent No.: US 11,327,281 B2
(45) Date of Patent: May 10, 2022

(54) ZOOM LENS AND IMAGE PICKUP APPARATUS INCLUDING THE SAME

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/795,229

(22) Filed: Feb. 19, 2020

(65) Prior Publication Data

US 2020/0271906 A1    Aug. 27, 2020

(30) Foreign Application Priority Data

Feb. 22, 2019    (JP) .............................. JP2019-030180

(51) Int. Cl.
*G02B 15/14*    (2006.01)
*G02B 15/20*    (2006.01)

(52) U.S. Cl.
CPC ......... *G02B 15/1461* (2019.08); *G02B 15/20* (2013.01)

(58) Field of Classification Search
CPC .... G02B 15/1461; G02B 15/16; G02B 15/20; G02B 15/145121; G02B 15/14; G02B 15/15; G02B 15/155; G02B 15/163; G02B 15/167; G02B 15/17; G02B 15/173; G02B 15/1441
USPC ........................................ 359/684; 348/208.4
See application file for complete search history.

(56) References Cited

U.S. PATENT DOCUMENTS

| | | | |
|---|---|---|---|
| 2010/0214658 A1* | 8/2010 | Ito | G02B 15/145121 359/557 |
| 2018/0045928 A1 | 2/2018 | Takemoto | |
| 2018/0292627 A1 | 10/2018 | Takemoto | |

FOREIGN PATENT DOCUMENTS

| | | |
|---|---|---|
| JP | 2014-010324 A | 1/2014 |
| JP | 2018-25624 A | 2/2018 |
| JP | 2018-045157 A | 3/2018 |
| JP | 2018-169635 A | 11/2018 |
| JP | 2018-180203 A | 11/2018 |
| JP | 2019-8088 A | 1/2019 |

* cited by examiner

*Primary Examiner* — Kristina M Deherrera
(74) *Attorney, Agent, or Firm* — Canon U.S.A., Inc. IP Division

(57) ABSTRACT

Provided is a zoom lens consisting of, in order from object side to image side, a positive first lens unit, a negative second lens unit, a positive third lens unit and a rear lens group including a plurality of lens units in which intervals between adjacent lens units are changed during zooming. The first lens unit does not move during zooming. The third lens unit moves toward object side during zooming from wide angle end to telephoto end. The first lens unit includes three or more positive lenses. A focal length of zoom lens at wide angle end, a focal length of first lens unit, a distance from a lens surface closest to object side to an image plane, a back focus at wide angle end, and a focal length of a positive lens having a smallest refractive power among positive lenses included in first lens unit are appropriately set.

14 Claims, 11 Drawing Sheets

ZOOM LENS AND IMAGE PICKUP APPARATUS INCLUDING THE SAME

BACKGROUND

Field of the Disclosure

The present disclosure relates to a zoom lens, which is suitable for an image pickup optical system for use with, for example, a digital still camera, a video camera, a monitoring camera, a broadcasting camera, or other such image pickup apparatus.

Description of the Related Art

In Japanese Patent Application Laid-Open No. 2014-010324, there is disclosed a zoom lens consisting of, in order from an object side to an image side, a first lens unit to a fourth lens unit having positive, negative, positive, and positive refractive powers, respectively, and an interval between each pair of adjacent lens units is changed during zooming. In Japanese Patent Application Laid-Open No. 2014-010324, the first lens unit does not move during zooming. Further, during zooming from a wide angle end to a telephoto end, the second lens unit moves toward the image side, the third lens unit moves toward the object side, and the fourth lens unit moves to correct image plane variation due to magnification varying.

In Japanese Patent Application Laid-Open No. 2018-045157, there is disclosed a zoom lens consisting of, in order from an object side to an image side, a first lens unit to a fifth lens unit having positive, negative, positive, negative and positive refractive powers, respectively, and an interval between each pair of adjacent lens units is changed during zooming. In Japanese Patent Application Laid-Open No. 2018-045157, the first and fifth lens units do not move during zooming. Further, during zooming from a wide angle end to a telephoto end, the second lens unit moves toward the image side, and the third lens unit and the fourth lens unit move toward the object side.

In Japanese Patent Application Laid-Open No. 2018-169635, there is disclosed a zoom lens of a so-called mirrorless type having a back focus set short, the zoom lens consisting of, in order from an object side to an image side, a first lens unit to a fourth lens unit having positive, negative, positive, and positive refractive powers, respectively, and an interval between each pair of adjacent lens units is changed during zooming. In Japanese Patent Application Laid-Open No. 2018-169635, during zooming from a wide angle end to a telephoto end, the first lens unit moves toward the image side, and the second, third, and fourth lens units move in a non-linear manner.

In recent years, a zoom lens to be used for an image pickup apparatus has been required to have a high zoom ratio under a large aperture ratio, a short total lens length, and a small lens barrel diameter, and to easily perform smooth and quick electric zooming.

In a positive-lead type zoom lens, in order to reduce the total lens length and the lens barrel diameter and to obtain a smooth and quick electric zoom mechanism, it is required to increase the refractive power of each of the lens units, and reduce the mass of a lens unit configured to move during zooming. Among other things, in a zoom lens having a large aperture ratio, the second lens unit serving as a main magnification-varying lens unit and a lens unit subsequent to the second lens unit also have a large lens diameter. As a result, the mass of a lens unit configured to move during zooming tends to increase, and arrangement of refractive powers of the first lens unit and the second lens unit, which are configured to determine a light flux to pass through a rear lens group, is particularly important.

Further, when the zoom magnification is high, an image blur correction function (image stabilizing function) for compensating for image blur that occurs due to vibration in a telephoto region is desired. However, when arrangement of refractive powers of respective lens units is not appropriate, it is difficult to select a lens unit having a small mass.

SUMMARY OF THE INVENTION

The present disclosure provides a zoom lens having a high zoom magnification under a large aperture ratio, enabling the total lens length to be easily reduced, having a small lens barrel diameter, and being configured to easily perform quick zooming. The zoom lens according to the present invention consists of, in order from an object side to an image side, a first lens unit having a positive refractive power, a second lens unit having a negative refractive power, a third lens unit having a positive refractive power and a rear lens group including a plurality of lens units in which an interval between each pair of adjacent lens units is changed during zooming. The first lens unit is configured not to move during zooming. The third lens unit is configured to move toward the object side during zooming from a wide angle end to a telephoto end. The first lens unit includes three or more positive lenses. The following conditional expressions are satisfied:

$$0.18 < fw/f1 < 5.00;$$

$$8.2 < TTD/skw < 100.0; \text{ and}$$

$$0.5 < f1\ min/f1 < 50.0,$$

where fw represents a focal length of the zoom lens at the wide angle end, f1 represents a focal length of the first lens unit, TTD represents a distance from a lens surface closest to the object side to an image plane, skw represents a back focus at the wide angle end, and f1 min represents a focal length of a positive lens having a smallest refractive power among the three or more positive lenses included in the first lens unit.

Further features of the present invention will become apparent from the following description of exemplary embodiments with reference to the attached drawings.

DESCRIPTION OF THE EMBODIMENTS

Now, exemplary embodiments of the present invention are described with reference to the accompanying drawings. A zoom lens according to embodiments of the present invention consists of, in order from an object side to an image side, a first lens unit having a positive refractive power, a second lens unit having a negative refractive power, a third lens unit having a positive refractive power, and a rear lens group including a plurality of lens units. An interval between each pair of adjacent lens units is changed during zooming. Further, the first lens unit is configured not to move during zooming. Further, the third lens unit is configured to move toward the object side during zooming from a wide angle end to a telephoto end. Further, the first lens unit includes three or more positive lenses.

Figure 1:
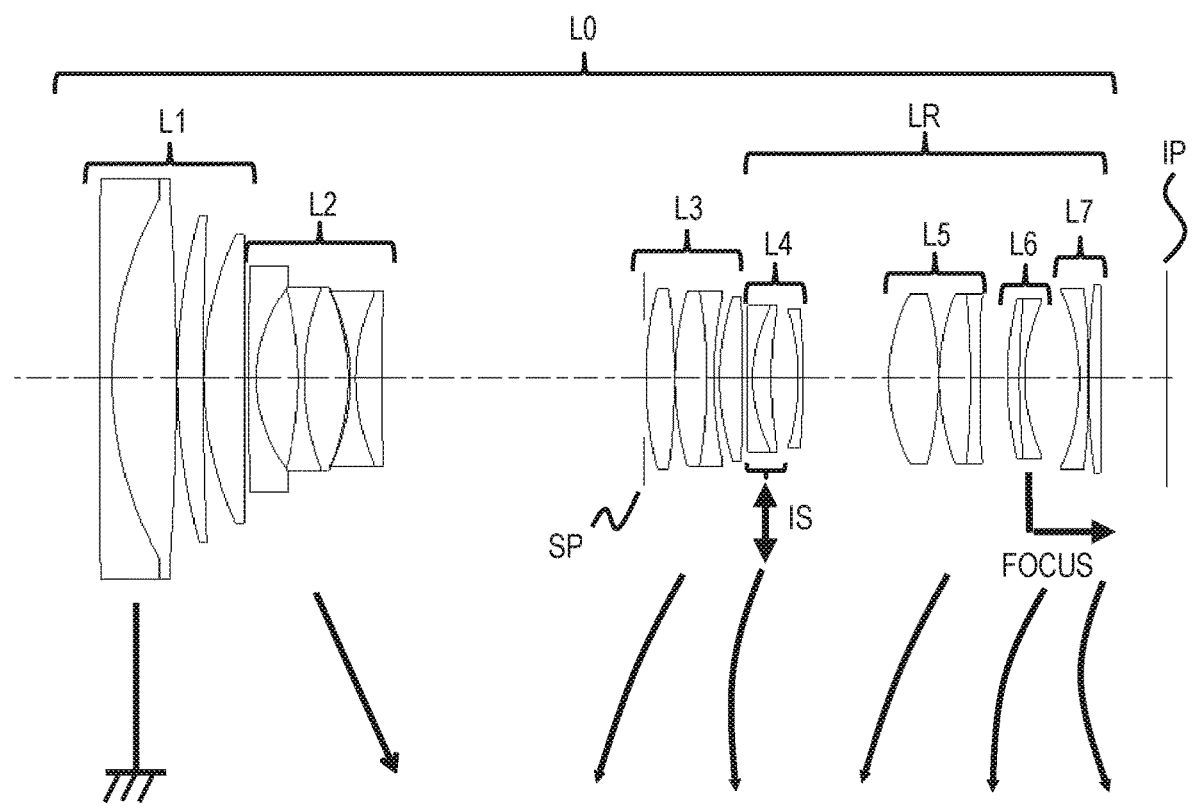
FIG. 1 is a lens cross-sectional view of a zoom lens according to Example 1 of the present invention at a wide angle end.
Figure 2:
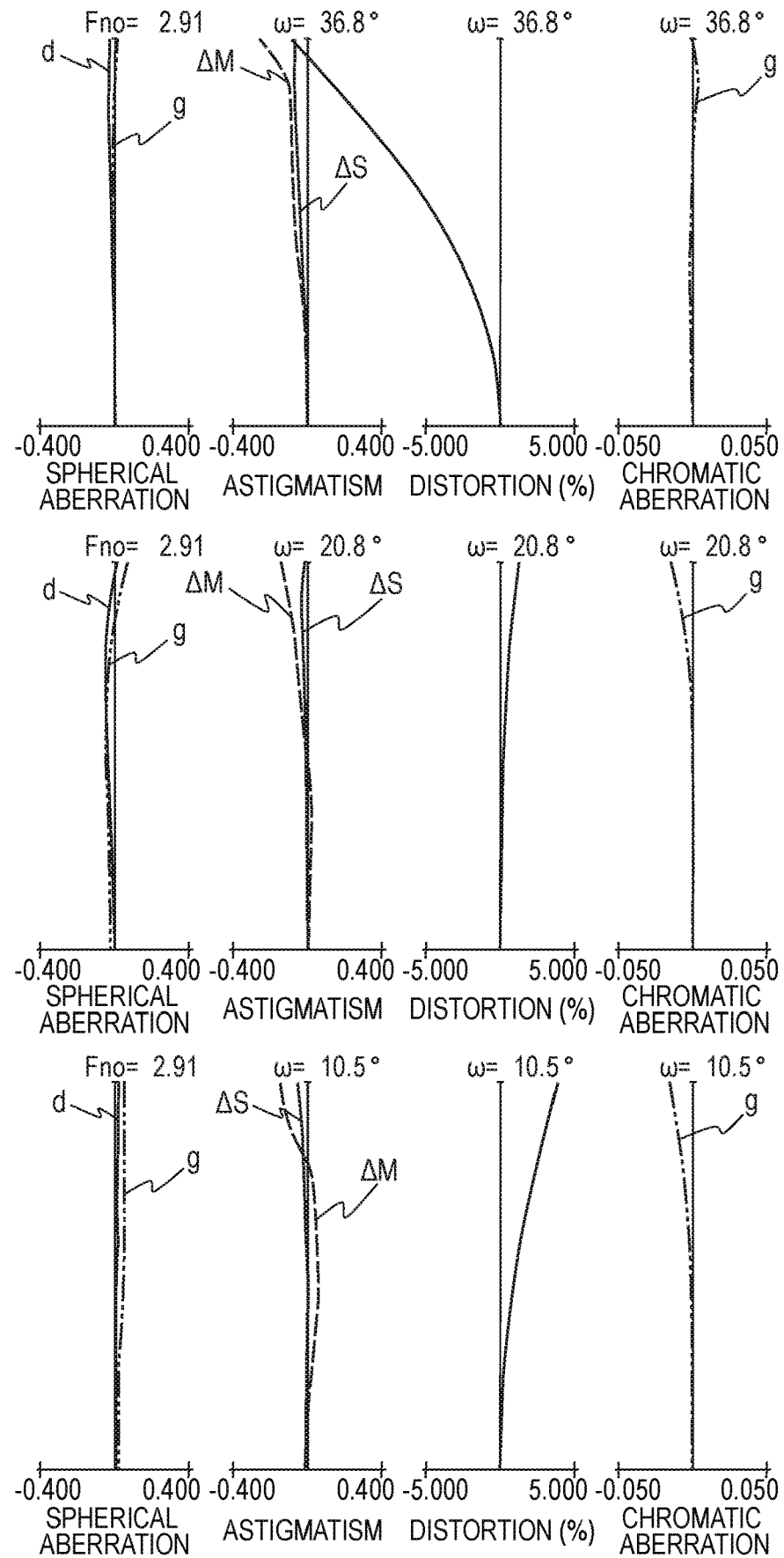
FIG. 2 shows aberration diagrams of the zoom lens according to Example 1.
Figure 3:
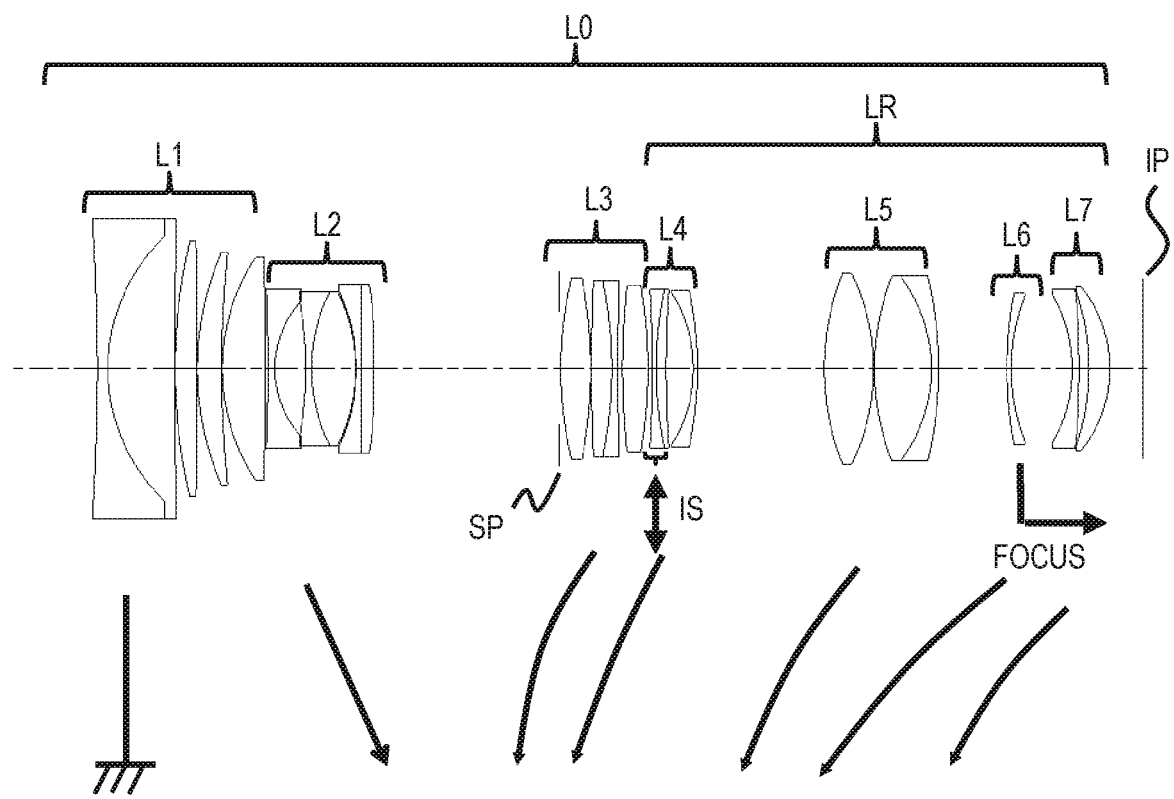
FIG. 3 is a lens cross-sectional view of a zoom lens according to Example 2 of the present invention at a wide angle end.
Figure 4:
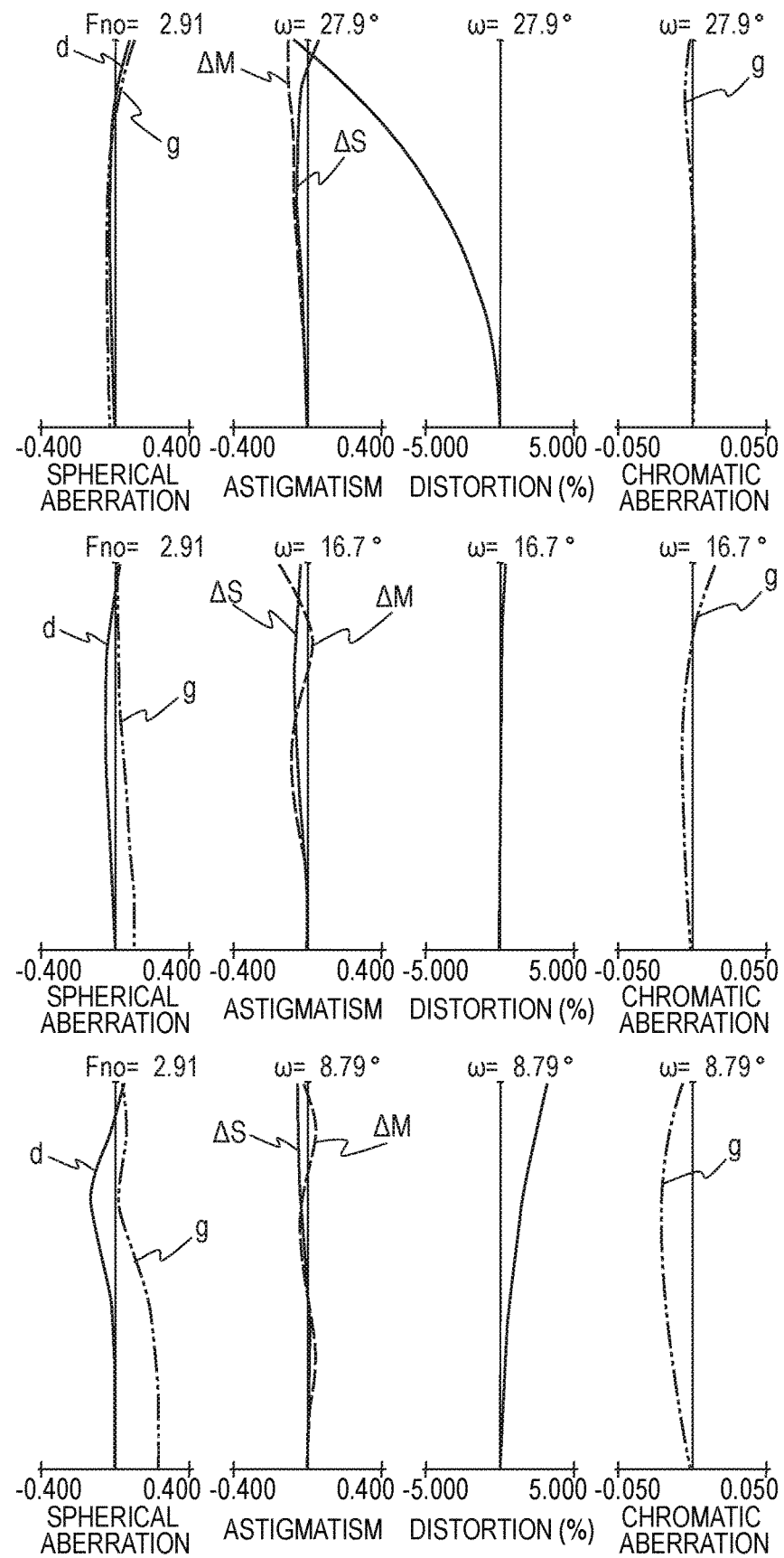
FIG. 4 shows aberration diagrams of the zoom lens according to Example 2.
Figure 5:
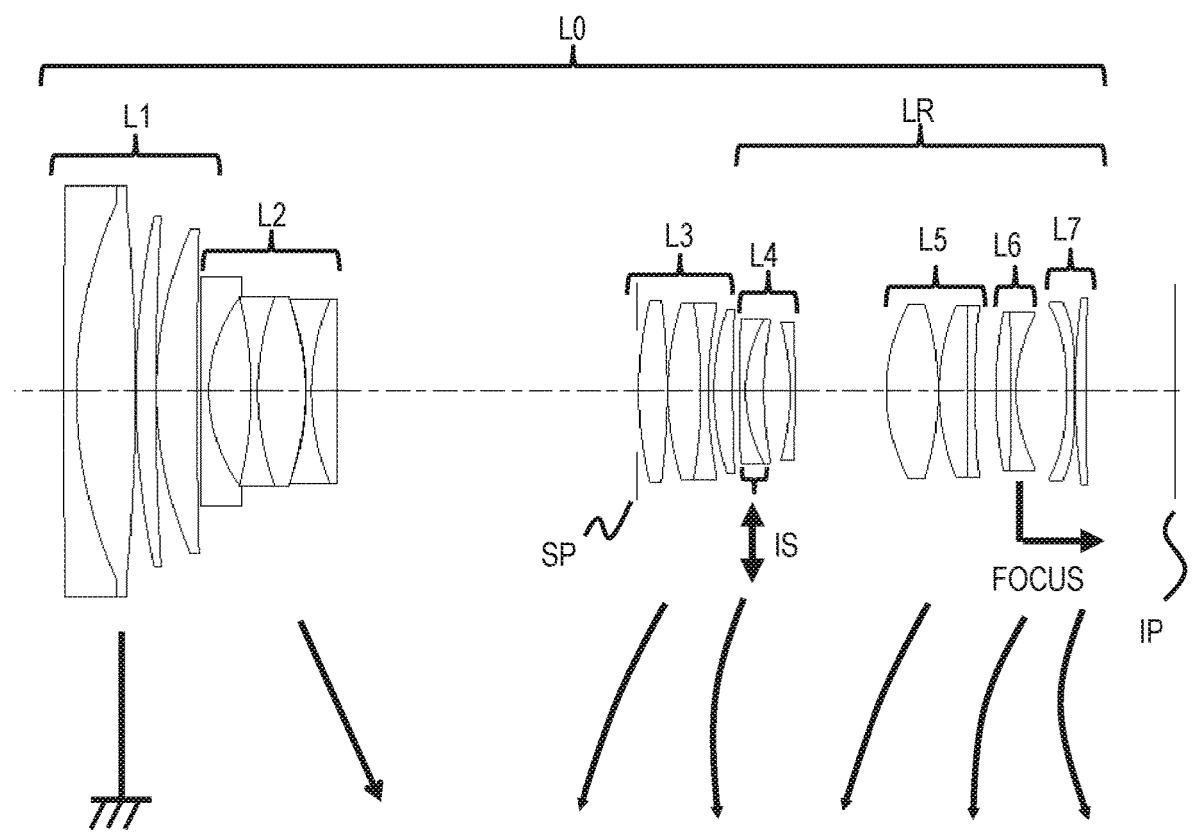
FIG. 5 is a lens cross-sectional view of a zoom lens according to Example 3 of the present invention at a wide angle end.
Figure 6:
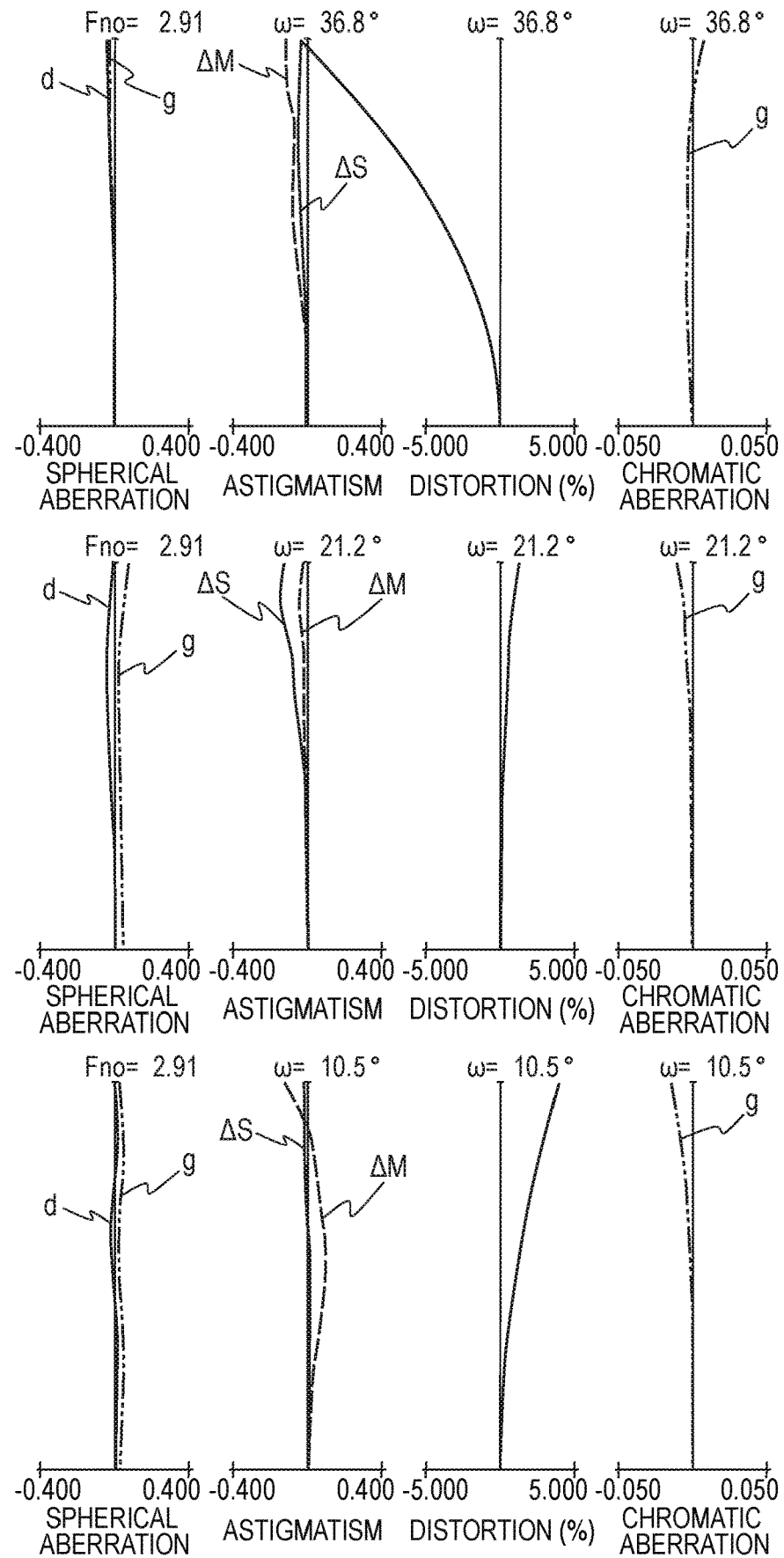
FIG. 6 shows aberration diagrams of the zoom lens according to Example 3.
Figure 7:
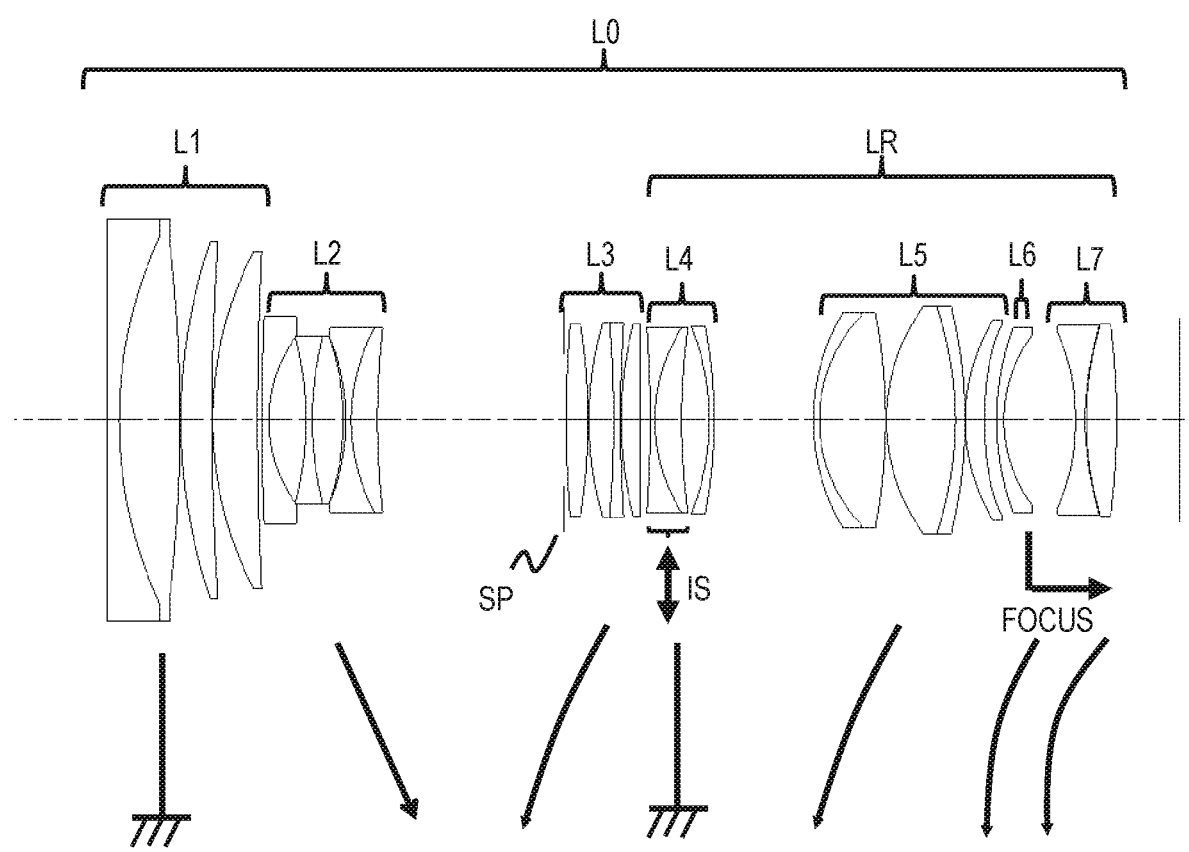
FIG. 7 is a lens cross-sectional view of a zoom lens according to Example 4 of the present invention at a wide angle end.
Figure 8:
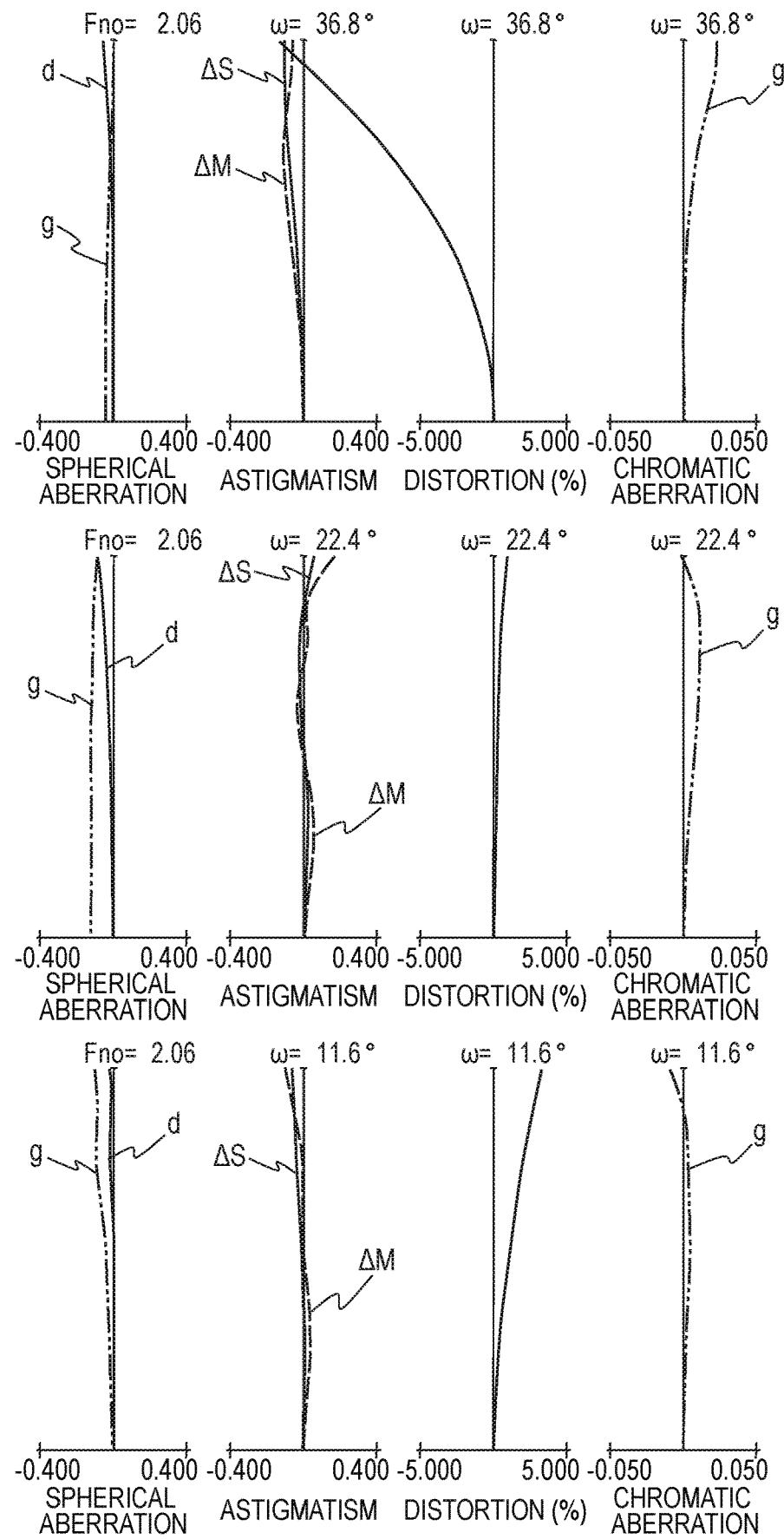
FIG. 8 shows aberration diagrams of the zoom lens according to Example 4.
Figure 9:
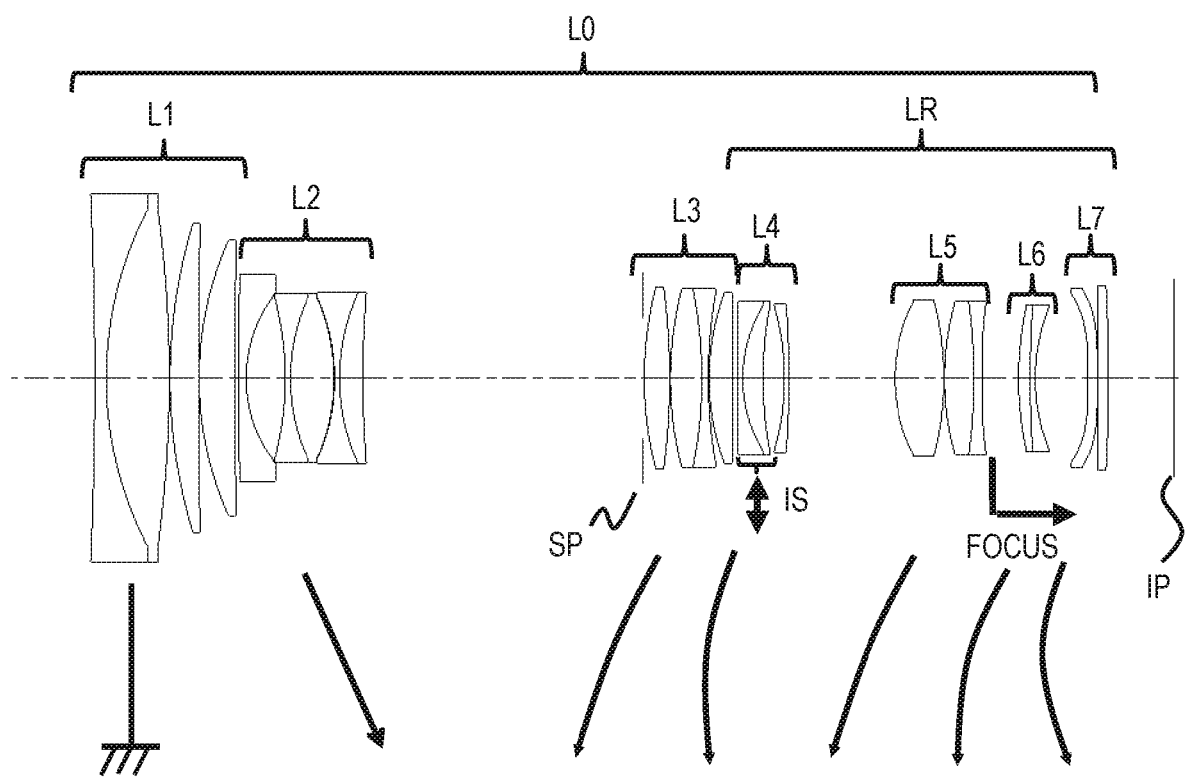
FIG. 9 is a lens cross-sectional view of a zoom lens according to Example 5 of the present invention at a wide angle end.
Figure 10:
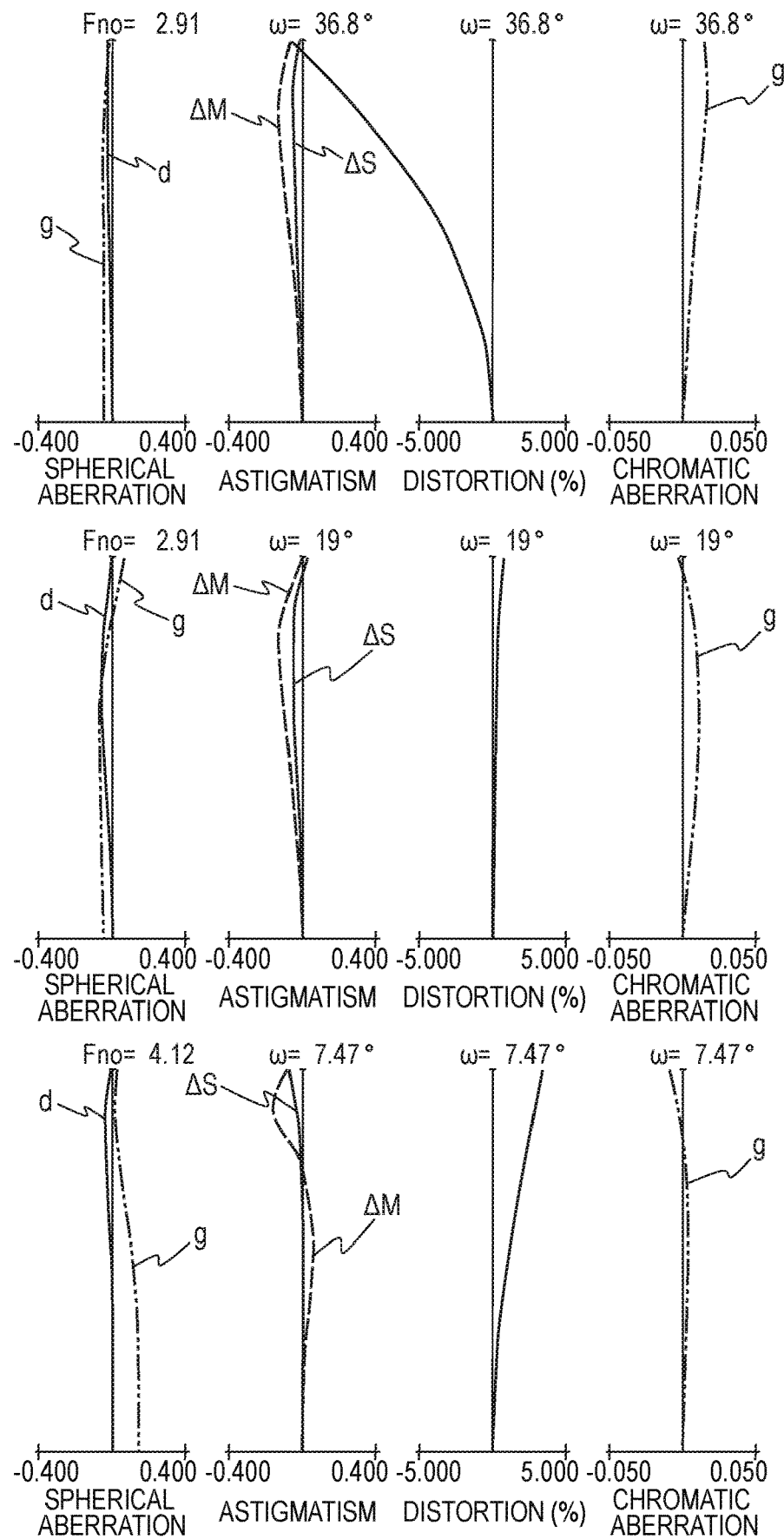
FIG. 10 shows aberration diagrams of the zoom lens according to Example 5.
Figure 11:
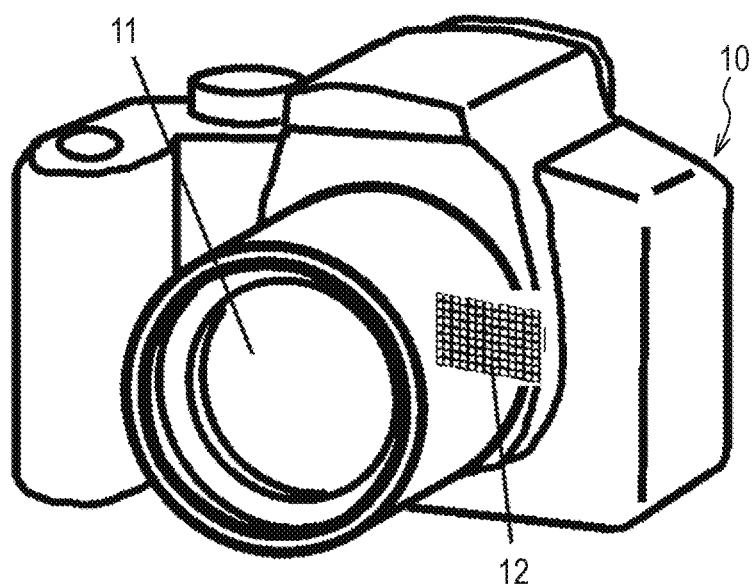
FIG. 11 is a schematic view of a main part of an image pickup apparatus according to the present invention.

FIG. 1, FIG. 3, FIG. 5, FIG. 7, and FIG. 9 are lens cross-sectional views of zoom lenses according to Example 1 to Example 5 of the present invention at a wide angle end (short focal length end), respectively. FIG. 2, FIG. 4, FIG. 6, FIG. 8, and FIG. 10 show aberration diagrams of the zoom lenses according to Example 1 to Example 5 under a state in which the zoom lenses are focused at infinity, respectively. Respective aberration diagrams show aberrations at the wide angle end, an intermediate zoom position, and a telephoto end (long focal length end) in order from the top. Example 1 relates to a zoom lens having a zoom ratio of 4.71 and an f-number of 2.91. Example 2 relates to a zoom lens having a zoom ratio of 4.00 and an f-number of 2.91. Example 3 relates to a zoom lens having a zoom ratio of 4.71 and an f-number of 2.91. Example 4 relates to a zoom lens having a zoom ratio of 4.20 and an f-number of 2.20. Example 5 relates to a zoom lens having a zoom ratio of 6.67, an f-number of 2.91 at a wide angle end, and an f-number of 4.12 at a telephoto end. FIG. 11 is a schematic view of a main part of an image pickup apparatus according to the present invention.

The zoom lens according to each of Examples is an image pickup optical system for use with an image pickup apparatus, for example, a video camera, a digital still camera, or a TV camera. The zoom lens according to each of Examples may also be used as a projection optical system for a projection device (projector). In the lens cross-sectional views, the left side is an object side (front side), and the right side is an image side (rear side). Moreover, in the lens cross-sectional views, a zoom lens is denoted by L0. When the position of a lens unit in the order from the object side is represented by "i", the i-th lens unit is denoted by Li.

A rear lens group LR includes a plurality of lens units. An aperture stop SP determines (restricts) a light flux at an open f-number (Fno). A subunit IS for correcting image blur is also provided. As an image plane IP, an image pickup surface of a solid-state image pickup element (photo-electric conversion element), for example, a CCD sensor or a CMOS sensor, is placed when the zoom lens is used as a photographing optical system of a video camera or a digital still camera. The arrows indicate movement loci of the lens units during zooming from the wide angle end to the telephoto end.

The arrow relating to "focus" indicates a movement direction of a lens unit during focusing from infinity to a close distance.

In the aberration diagrams, an f-number is represented by Fno, and a half angle of view (degrees) is represented by co, and is an angle of view in ray tracing value. In the spherical aberration diagrams, a solid line "d" indicates a d-line (wavelength: 587.56 nm), a two-dot chain line "g" indicates a g-line (wavelength: 435.835 nm). In the astigmatism diagrams, a solid line ΔS indicates a sagittal image plane with respect to the d-line, and a broken line ΔM indicates a meridional image plane with respect to the d-line. The distortion is depicted for the d-line. In the lateral chromatic aberration diagrams, a two-dot chain line "g" indicates the g-line, a one-dot chain line C indicates a C-line (wavelength: 656.3 mm), and a broken line F indicates an F-line (wavelength: 486.1 mm).

The zoom lens L0 according to each of Examples consists of the following lens units in order from an object side to an image side: a first lens unit L1 having a positive refractive power; a second lens unit L2 having a negative refractive power; a third lens unit L3 having a positive refractive power; and a rear lens group LR including one or more lens units. Further, three or more positive lenses are arranged in the first lens unit L1.

In the positive-lead type zoom lens, in order to effectively use the back focus to reduce the total lens length, the negative refractive power of a lens unit having a negative refractive power, which is arranged on the object side of the aperture stop SP, is caused to become weaker to some extent. Moreover, the positive refractive power of a lens unit having a positive refractive power, which is arranged on the image side of the aperture stop SP, is caused to become stronger.

Further, in order to reduce the lens effective diameters of the second lens unit L2 and the subsequent lens units, three or more positive lenses are used for the first lens unit L1 to distribute a positive refractive power to each lens while at the same time increasing the positive refractive power. With this configuration, satisfactory optical performance is easily ensured over the entire zoom range. Further, the mass of each lens unit configured to move during zooming is reduced to easily achieve smooth zooming.

Next, the lens configuration in each of Examples is described.

The zoom lens according to Example 1 consists of the following lens units in order from the object side to the image side: a first lens unit L1 having a positive refractive power; a second lens unit L2 having a negative refractive power; a third lens unit L3 having a positive refractive power; a fourth lens unit L4 having a negative refractive power; a fifth lens unit L5 having a positive refractive power; a sixth lens unit L6 having a negative refractive power; and a seventh lens unit L7 having a negative refractive power. Example 1 relates to a seven-unit zoom lens. A cemented lens obtained by cementing a negative lens and a positive lens, which are included in the fourth lens unit L4, is the subunit IS for correcting image blur, and overall has a negative refractive power. Further, a sixth lens unit L6 is configured to move toward the image side during focusing from infinity to a close distance.

The first lens unit L1 is configured not to move during zooming. During zooming from the wide angle end to the telephoto end, the second lens unit L2 is configured to linearly move toward the image side, the third lens unit L3 is configured to move toward the object side, and the fourth lens unit L4 is configured to move toward the object side so as to increase the interval between the third lens unit L3 and the fourth lens unit L4. The third lens unit L3 includes an aperture stop SP. The fifth lens unit L5 and the sixth lens unit L6 are configured to move toward the object side so as to increase the interval therebetween. The seventh lens unit L7, which is the last lens unit, is configured to move toward the object side in such a manner as to draw a locus that is convex toward the object side. Further, in the first lens unit L1, three positive lenses are arranged consecutively after a negative lens.

In Example 2, the number of lens units, the sign of a refractive power of each lens unit, and a subunit for correcting image blur are the same as those of Example 1. Further, the lens unit configured to move during focusing and the focusing method, for example, the movement direction, are the same as those of Example 1. The first lens unit L1 is configured not to move during zooming.

During zooming from the wide angle end to the telephoto end, the second lens unit L2 is configured to linearly move toward the image side, the third lens unit L3 is configured to move toward the object side, and the fourth lens unit L4 is configured to move toward the object side so as to increase the interval between the third lens unit L3 and the fourth lens unit L4. The third lens unit L3 includes an aperture stop SP. The fifth lens unit L5 and the sixth lens unit L6 are configured to move toward the object side so as to decrease the interval therebetween. The seventh lens unit L7, which is the last lens unit, is configured to move toward the object side. Further, in the first lens unit, four positive lenses are arranged consecutively after a negative lens.

In Example 3, the number of lens units, the sign of a refractive power of each lens unit, and a subunit for correcting image blur are the same as those of Example 1. Further, the lens unit configured to move during focusing and the focusing method, for example, the movement direction, are the same as those of Example 1. Further, the movement direction of each lens unit configured to move during zooming is also the same as that of Example 1. In the first lens unit L1, three positive lenses are arranged consecutively after a negative lens.

In Example 4, the number of lens units, the sign of a refractive power of each lens unit, and a subunit for correcting image blur are the same as those of Example 1. Further, the lens unit configured to move during focusing and the focusing method, for example, the movement direction, are the same as those of Example 1. The first lens unit L1 and the fourth lens unit L4 are configured not to move during zooming.

During zooming from the wide angle end to the telephoto end, the second lens unit L2 is configured to linearly move toward the image side, the third lens unit L3 is configured to move toward the object side, and the fifth lens unit L5 and the sixth lens unit L6 are configured to move toward the object side so as to decrease the interval therebetween. The seventh lens unit L7, which is the last lens unit, is configured to move toward the object side. Further, in the first lens unit L1, three positive lenses are arranged consecutively after a negative lens.

In Example 5, the number of lens units, the sign of a refractive power of each lens unit, and a subunit for correcting image blur are the same as those of Example 1. Further, the lens unit configured to move during focusing and the focusing method, for example, the movement direction, are the same as those of Example 1. Further, the movement direction of each lens unit configured to move during zooming is also the same as that of Example 1. In the first lens unit L1, three positive lenses are arranged consecutively after a negative lens.

In each Example, a focal length of the zoom lens L0 at the wide angle end is represented by fw, a focal length of the first lens unit L1 is represented by f1, a total lens length is represented by TTD, and a back focus at the wide angle end is represented by skw. Among positive lenses included in the first lens unit L1, the focal length of a positive lens having the smallest refractive power (having the longest focal length) is represented by f1 min.

In this case, the following conditional expressions are satisfied.

$$0.18 < fw/f1 < 5.00 \tag{1}$$

$$8.2 < TTD/skw < 100.0 \tag{2}$$

$$0.5 < f1\ min/f1 < 50.0 \tag{3}$$

Next, technical meanings of the above-mentioned conditional expressions are described.

In order to reduce the weight of each lens unit configured to move during zooming of the second lens unit L2 and the subsequent lens units, and achieve smooth zooming, the conditional expression (1) sets the focal length of the first lens unit L1 and the focal length of the zoom lens at the wide angle end.

When the ratio exceeds the upper limit value in the conditional expression (1), and the positive focal length f1 of the first lens unit L1 becomes shorter, the diameter of a light flux passing through the second lens unit L2 decreases, which is advantageous for downsizing of a movable lens unit. However, the positive refractive power of the first lens unit L1 becomes too strong, and an aberration that occurs due to the first lens unit L1 becomes too large. In particular, large amounts of a spherical aberration and an axial chromatic aberration occur at the telephoto end, and it becomes disadvantageously difficult to correct those aberrations. Further, the volume of the first lens unit L1 also increases, and thus it becomes difficult to downsize the lens.

Further, when the ratio exceeds the upper limit value in the conditional expression (1), and the focal length fw of the zoom lens L0 at the wide angle end becomes longer, it becomes difficult to obtain a predetermined image pickup field of view at the wide angle end.

When the ratio falls below the lower limit value in the conditional expression (1), and the focal length f1 of the first lens unit L1 becomes longer, the positive refractive power of the first lens unit L1 becomes weaker, and thus the light flux passing through the second lens unit L2 does not sufficiently converge. Then, the mass of the second lens unit L2 tends to become larger, and it becomes difficult to perform smooth zooming. Further, the lens diameters of the second lens unit L2 and the subsequent lens units tend to disadvantageously fail to be reduced. Further, a relationship of telephoto arrangement at the telephoto end becomes insufficient, and thus the total lens length increases.

Further, when the ratio falls below the lower limit value in the conditional expression (1), and the focal length fw of the zoom lens L0 at the wide angle end becomes shorter, the negative refractive power due to each lens unit at the object side of the aperture stop SP for achieving a wider angle of view increases, which is disadvantageous in terms of decreasing the optical performance and further increasing the effective diameter of a front lens.

The conditional expression (2) appropriately sets the total lens length and the back focus in order to obtain a zoom lens having a short total lens length.

When the ratio exceeds the upper limit value in the conditional expression (2), and the total lens length at the wide angle end becomes longer, it becomes difficult to reduce the total lens length. Further, the back focus skw becomes too short, and the mechanical arrangement of a connection portion between the last lens unit and the camera body becomes difficult.

When the ratio falls below the lower limit value in the conditional expression (2), and the total lens length at the wide angle end becomes shorter, the positive refractive power of the entire zoom lens becomes too strong, and as a result, it becomes difficult to reduce the Petzval sum and thus becomes difficult to obtain desired optical performance. In another case, the back focus skw becomes too long, and it becomes difficult to reduce the total lens length.

In order to reduce the total lens length and the lens diameters of the second lens unit L2 and the subsequent lens units, the conditional expression (3) sets the focal length f1 min of the lens having the smallest refractive power and the focal length f1 of the first lens unit L1 among positive lenses included in the first lens unit L1.

When the ratio exceeds the upper limit value in the conditional expression (3), and the focal length f1 min becomes longer, it is required to secure a space for arranging an unrequired positive lens in the first lens unit L1, which is required to have a positive refractive power, and as a result, the size of the first lens unit L1 increases, and it becomes difficult to reduce the total lens length. In another case, the focal length f1 of the first lens unit L1 becomes shorter, and the positive refractive power of the first lens unit L1 becomes too strong, which enables the zoom lens to be easily downsized. However, it becomes difficult to construct the second lens unit L2 and the subsequent lens units with the use of a smaller number of lenses to satisfactorily correct, for example, spherical aberration and coma.

When the ratio falls below the lower limit value in the conditional expression (3), and the focal length f1 min becomes shorter, the refractive power of a positive lens included in the first lens unit L1 becomes too strong, and it becomes difficult to correct the spherical aberration at the telephoto end. In another case, the focal length f1 of the first lens unit L1 becomes longer, and the lens diameters of the second lens unit L2 and the subsequent lens units become larger. As a result, it becomes difficult to reduce the weight of a lens unit configured to move during zooming.

In each of Examples, it is preferred to satisfy one or more of conditional expressions provided below.

A total lens thickness of the first lens unit L1 is represented by TD1. A movement amount of the third lens unit L3 during zooming from the wide angle end to the telephoto end is represented by m3, and a focal length of the third lens unit L3 is represented by f3. A focal length of the zoom lens L0 at the telephoto end is represented by ft. An exit pupil distance (distance from image plane to exit pupil on optical axis) of the zoom lens L0 at the wide angle end is represented by POw. A focal length of the second lens unit L2 is represented by f2. In an image pickup apparatus including the zoom lens L0 and an image pickup element configured to receive light of an image formed by the zoom lens L0, an imaging half angle of view at the wide angle end is represented by ω.

$$0.05 < TD1/TTD < 0.28 \tag{4}$$

$$-5.00 < m3/f3 < -0.05 \tag{5}$$

$$2 < ft/fw < 15 \tag{6}$$

$$-20 < POw/fw < -2 \tag{7}$$

$$-0.90 < f2/ft < -0.05 \tag{8}$$

$$-8 < f1/f2 < -1 \tag{9}$$

$$0.04 < fw \times \tan \omega / TTD < 0.20 \tag{10}$$

In order to reduce the total lens length, the conditional expression (4) sets a total lens thickness TD1 (length on optical axis from lens surface closest to object side of first lens unit L1 to lens surface closest to image side of first lens unit L1) of the first lens unit L1.

When the ratio exceeds the upper limit value in the conditional expression (4), and the total thickness TD1 of the first lens unit L1 becomes larger, a ratio of a volume of the first lens unit L1 to the total lens length becomes too large, and the mass disadvantageously increases significantly due to increase in size of the effective diameter of a front lens. Further, the total lens length TTD becomes too short, and it is required to increase the refractive power of each lens unit. As a result, it becomes difficult to correct spherical aberration and coma.

When the ratio falls below the lower limit value in the conditional expression (4), and the total thickness TD1 of the first lens unit L1 becomes smaller, it becomes difficult to ensure the positive refractive power of the first lens unit L1 for decreasing the diameter of a light flux passing through the second lens unit L2. Further, in order to increase the refractive power with a small volume, the refractive index of the material of a positive lens is required to be set high, and the Petzval sum becomes too large in the positive direction. As a result, it becomes difficult to correct the field curvature, or it becomes difficult to reduce the total lens length because the total lens thickness TTD becomes too large.

In order to increase the zoom magnification, the conditional expression (5) sets the movement amount m3 and the focal length f3 during zooming of the third lens unit L3. The movement amount of a lens unit herein refers to a difference between respective positions on the optical axis of the lens unit at the wide angle end and the telephoto end, and the sign of the movement amount is negative when the lens unit is positioned on the object side at the telephoto end compared to the wide angle end, and is positive when the lens unit is positioned on the image side at the telephoto end compared to the wide angle end.

When the ratio falls below the lower limit value in the conditional expression (5), and the movement amount m3 of the third lens unit L3 becomes larger, the total lens length disadvantageously increases to ensure a movement space. Further, the focal length f3 of the third lens unit L3 becomes shorter, and an aberration that occurs due to the third lens unit L3, in particular, a spherical aberration at the telephoto end, disadvantageously increases.

When the ratio exceeds the upper limit value in the conditional expression (5), and the movement amount m3 of the third lens unit L3 becomes smaller, it becomes difficult to obtain a desired zoom magnification. Further, a share ratio of magnification varying of the second lens unit L2, which is a main magnification-varying lens unit, is required to be increased in order to obtain a desired zoom magnification, and it becomes difficult to correct, for example, the field curvature that varies due to zooming. In another case, when the ratio exceeds the upper limit value in the conditional expression (5), and the focal length f3 of the third lens unit L3 becomes longer, the share value of magnification varying of the second lens unit L2, which is the main magnification-varying lens unit, is required to be increased, and it becomes difficult to correct, for example, the field curvature that varies due to zooming.

The conditional expression (6) is a zoom magnification that is defined to obtain a desired zoom magnification (zoom ratio).

When the ratio exceeds the upper limit value in the conditional expression (6), and the focal length ft of the zoom lens L0 at the telephoto end becomes longer, it becomes difficult to correct the spherical aberration and the axial chromatic aberration, which occur at the telephoto end, while at the same time maintaining downsizing of the entire lens system. In another case, when the focal length fw of the zoom lens L0 at the wide angle end becomes shorter, the effective diameter of a front lens increases in order to ensure a peripheral light amount at the wide angle end.

When the ratio falls below the lower limit value in the conditional expression (6), it becomes difficult to ensure a desired zoom magnification. Further, when the ratio falls below the lower limit value in the conditional expression (6), and the focal length of a zoom lens at the wide angle end becomes longer, it becomes difficult to obtain a predetermined field of view at the wide angle end.

In order to ensure a high telecentricity, the conditional expression (7) defines a relationship between the exit pupil distance POw at the wide angle end and the focal length fw of a zoom lens at the wide angle end. The exit pupil distance POw is a distance from the image plane (paraxial image plane). It is assumed that the sign of the distance is negative at the time of measurement toward the object side, and is positive at the time of measurement toward the image side.

When the ratio falls below the lower limit value in the conditional expression (7), and the exit pupil distance POw from the image plane becomes longer, the refractive power of the last lens unit tends to increase, and it becomes difficult to sufficiently suppress the field curvature.

When the ratio exceeds the upper limit value in the conditional expression (7), and the exit pupil distance POw from the image plane becomes shorter, an angle of incidence of a ray of a peripheral image height on an image plane becomes too large, which is disadvantageous in terms of increased so-called shading. Further, the focal length fw of a zoom lens at the wide angle end becomes longer, and it becomes difficult to achieve desired zoom magnification.

In order to reduce the weight of a movable lens unit at the image side of the second lens unit L2 and reduce the total lens length, the conditional expression (8) defines the focal length f2 of the second lens unit L2 and the focal length ft of the zoom lens at the telephoto end.

When the ratio exceeds the upper limit value in the conditional expression (8), and the negative focal length f2 of the second lens unit L2 becomes shorter, a light flux passing through the third lens unit L3 and the subsequent lens units increases, and the lens diameter increases. As a result, it becomes difficult to reduce the weight of a lens unit configured to move during zooming. Further, when the negative refractive power of the second lens unit L2 becomes too strong (when absolute value of negative refractive power becomes too large), it becomes difficult to suppress variation in field curvature during zooming. In another case, the focal length ft of the zoom lens L0 at the telephoto end becomes too long, and it becomes difficult to correct the axial chromatic aberration at the telephoto end while at the same time maintaining a desired total lens length.

When the ratio falls below the lower limit value in the conditional expression (8), and the negative focal length f2 of the second lens unit L2 becomes longer, the movement distances of the second lens unit L2 and the subsequent lens units unit become longer in order to obtain a desired zoom magnification, and the total lens length increases. In another case, the focal length ft of the zoom lens L0 at the telephoto end becomes shorter, and thus it becomes difficult to obtain a predetermined image pickup field of view at the telephoto end.

In order to obtain a high optical performance and reduce the total lens length, the conditional expression (9) appropriately sets the ratio of the focal lengths of the first lens unit L1 to the second lens unit L2.

When the ratio falls below the lower limit value in the conditional expression (9), and the focal length f1 of the first lens unit L1 becomes longer, the effective lens diameters of the second lens unit L2 and the subsequent lens units become larger, and it becomes difficult to reduce the weight of a lens unit configured to move during zooming. In another case, the negative refractive power of the second lens unit L2 becomes relatively stronger, and as a result, it becomes difficult to reduce the image plane variation during zooming.

When the ratio exceeds the upper limit value in the conditional expression (9), and the focal length f1 of the first lens unit L1 becomes shorter, although this is advantageous for reducing the weight of the second lens unit L2, the positive refractive power of the first lens unit L1 becomes too strong. Then, it becomes difficult to correct the spherical aberration and the axial chromatic aberration at the telephoto end. Further, the negative focal length f2 of the second lens unit L2 becomes relatively longer, and it is required to increase the movement amount during zooming of the second lens unit L2 in order to obtain a desired zoom magnification, which is disadvantageous in terms of the increased total lens length.

In order to reduce the total lens length and obtain a predetermined angle of view at the wide angle end, the conditional expression (10) defines the focal length fw and the image pickup half angle of view of the zoom lens L0 at the wide angle end, and the total lens length TTD. The numerator fw×tan ω of the conditional expression (10) is equivalent to the image height at the wide angle end, and the conditional expression (10) indicates a relationship between the image height and the total lens length.

When the ratio exceeds the upper limit value in the conditional expression (10), and the numerator of the conditional expression (10) becomes larger, the focal length of the zoom lens at the wide angle end becomes longer. In another case, the total lens length TTD becomes too short, the arrangement of refractive powers of respective lens units becomes too strong, and it becomes difficult to correct aberrations.

When the ratio falls below the lower limit value in the conditional expression (10), and the numerator of the conditional expression (10) becomes smaller, the image pickup angle of view increases at the wide angle end, but the effective diameter of a front lens increases. Further, the total lens length TTD becomes disadvantageously longer.

In each of Examples, it is preferred to set the numerical ranges of the conditional expression (1) to the conditional expression (10) as follows.

$$0.19 < fw/f1 < 3.0 \tag{1a}$$

$$9.0 < TTD/skw < 50.0 \tag{2a}$$

$$1.0 < f1\ min/f1 < 20.0 \tag{3a}$$

$$0.08 < TD1/TTD < 0.20 \tag{4a}$$

$$-2.00 < m3/f3 < -0.08 \tag{5a}$$

$$2.5 < ft/fw < 10.0 \tag{6a}$$

$$-10.0 < POw/fw < -2.5 \tag{7a}$$

$$-0.50 < f2/ft < -0.10 \tag{8a}$$

$$-6.0 < f1/f2 < -1.5 \tag{9a}$$

$$0.06 < fw \times \tan \omega / TTD < 0.10 \tag{10a}$$

Moreover, in each of Examples, it is further preferred to set the numerical ranges of the conditional expression (1a) to the conditional expression (10a) as follows.

$$0.20 < fw/f1 < 1.00 \tag{1b}$$

$$10.0 < TTD/skw < 35.0 \tag{2b}$$

$$1.8 < f1 \min/f1 < 5.0 \tag{3b}$$

$$0.1 < TD1/TTD < 0.17 \tag{4b}$$

$$-1.0 < m3/f3 < -0.1 \tag{5b}$$

$$3 < ft/fw < 7 \tag{6b}$$

$$-9 < POw/fw < -3 \tag{7b}$$

$$-0.30 < f2/ft < -0.12 \tag{8b}$$

$$-4 < f1/f2 < -2 \tag{9b}$$

$$0.07 < fw \times \tan \omega / TTD < 0.09 \tag{10b}$$

In each of Examples, it is desired to adopt the following configuration.

A number of the positive lenses included in the first lens unit L1 is preferred to be equal to or smaller than four. Further, the first lens unit L1 is preferred to consist of a negative lens, a positive lens, a positive lens, and a positive lens, which are arranged in order from the object side to the image side.

Further, in each of Examples, in order to obtain a wide angle of view and a high zoom ratio while downsizing the zoom lens, the first lens unit L1 is preferred to have as a small number of lenses as possible. With this configuration, a height of incidence of an off-axis light flux passing through the first lens unit L1 becomes lower, and it is possible to reduce the effective diameter of the first lens unit L1. Therefore, in each of Examples, the first lens unit L1 is preferred to consist of five or less lenses. Further, in order to ensure a desired image pickup field of view at the wide angle end while at the same time correcting the spherical aberration at the telephoto end, the first lens unit L1 is desired to have a lens configuration in which a negative lens and a positive lens are first arranged in the stated order from the object side to the image side.

Further, in order to achieve a wider angle of view, the second lens unit L2 is preferred to include, in order from the object side to the image side, two negative lenses and one positive lens. With this configuration, the second lens unit L2 is configured to have a negative refractive power, which facilitates a wider angle of view.

Further, a subunit for correcting image blur is desired to be set as a subunit at the image side of the third lens unit L3, whose outer diameter can be reduced easily.

Further, various off-axis aberrations, in particular, astigmatism and distortion, are satisfactorily corrected by appropriately setting the refractive power of the rear lens group LR. Moreover, spherical aberration and coma are effectively corrected when a wider angle of view and a higher zoom ratio are achieved.

For example, the rear lens group LR is preferred to include a fourth lens unit having a negative refractive power and a fifth lens unit having a positive refractive power, which are arranged in order from the object side to the image side. In particular, the rear lens group LR is preferred to consist of a fourth lens unit having a negative refractive power, a fifth lens unit having a positive refractive power, a sixth lens unit having a negative refractive power, and a seventh lens unit having a negative refractive power, which are arranged in order from the object side to the image side.

Further, in order to reduce a change in image magnification due to focusing at the time of photographing a moving image, the focus lens unit is desired to be a lens unit at the image side of the third lens unit L3.

It is particularly preferred that a lens unit arranged at the image side of a lens unit closest to the object side of the rear lens group be configured to move during focusing. Further, it is preferred to move the subunit, which is arranged at the image side of the third lens unit L3, in a direction having a component perpendicular to the optical axis when correcting image blur.

In each of Examples, the components are configured in the above-mentioned manner, to thereby obtain a zoom lens having a high zoom magnification under a large aperture, a short total lens length, and a small lens barrel diameter, and being configured to easily perform quick zooming.

Next, a digital still camera (image pickup apparatus) according to an Example of the present invention, which uses the zoom lens according to any one of Examples of the present invention as an image pickup optical system, is described with reference to FIG. 11.

In FIG. 11, a camera main body 10, and an image pickup optical system 11 consisting of the zoom lens according to any one of Examples of the present invention are illustrated. An image pickup element (photo-electric conversion element) 12 such as a CCD sensor or a CMOS sensor is included in the camera main body 10, and is configured to receive light of an object image formed by the image pickup optical system 11.

Numerical Example 1 to Numerical Example 5 corresponding to Example 1 to Example 5, respectively, are provided below. In each of Numerical Examples, the position of a surface in the order from the object side is represented by "i". In each of Numerical Examples, a curvature radius of the i-th surface in the order from the object side is represented by ri, a lens thickness or air interval between the i-th surface and the (i+1)th surface in the order from the object side is represented by di, and a refractive index and an Abbe number of a material of a lens between the i-th surface and the (i+1)th surface in the order from the object side are represented by ndi and vdi, respectively. Symbol BF represents the back focus. When an X axis is set in the optical axis direction, an H axis is set in a direction perpendicular to the optical axis, a traveling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1 + \sqrt{1-(1+K)(H/R)^2}} + A2 \times H^2 +$$

$$A4 \times H^4 + A6 \times H^6 + A8 \times H^8 + A10 \times H^{10} + A12 \times H^{12}$$

In each aspherical coefficient, "e-x" means $10^{-x}$. Further, in addition to the specifications including the focal length and the f-number, an image height being a maximum image height for determining an image pickup half angle of view of the entire system and a half angle of view, and a total lens length being a distance from a first lens surface (lens surface closest to object side) to the image plane are indicated. Further, the back focus BF indicates an air-equivalent length from the last lens surface to the image plane. Further, each set of lens unit data indicates lens units and their focal lengths.

In addition, a part in which an interval "d" of each optical surface is (variable) is a part in which the interval "d" is changed during zooming, and an interval between surfaces corresponding to the focal length is shown in an annexed table. Results of calculations and values of parameters of the conditional expressions based on lens data in Numerical Example 1 to Numerical Example 5 provided below are shown in Table 1 and Table 2, respectively.

Numerical Example 1

| Unit: mm | | | | |
|---|---|---|---|---|
| Surface data | | | | |
| Surface number | r | d | nd | vd |
| 1 | 3,274.463 | 2.50 | 1.95375 | 32.3 |
| 2 | 72.668 | 12.89 | 1.49700 | 81.5 |
| 3 | −515.818 | 0.15 | | |
| 4 | 123.847 | 5.16 | 1.72916 | 54.7 |
| 5 | 722.019 | 0.15 | | |
| 6 | 69.607 | 7.99 | 1.72916 | 54.7 |
| 7 | ∞ | (Variable) | | |
| 8 | 978.038 | 1.55 | 1.88300 | 40.8 |
| 9 | 30.065 | 8.39 | | |
| 10 | −70.832 | 1.30 | 1.90043 | 37.4 |
| 11 | 50.469 | 8.76 | 1.78472 | 25.7 |
| 12 | −44.699 | 0.45 | | |
| 13 | −40.895 | 1.10 | 1.59522 | 67.7 |
| 14 | 40.537 | 5.04 | 1.85400 | 40.4 |
| 15* | 303.843 | (Variable) | | |
| 16 (Stop) | ∞ | 0.40 | | |
| 17 | 74.118 | 5.63 | 2.05090 | 26.9 |
| 18 | −153.763 | 0.15 | | |
| 19 | 61.768 | 6.36 | 1.49700 | 81.5 |
| 20 | −111.150 | 1.40 | 1.89286 | 20.4 |
| 21 | 78.699 | 1.19 | | |
| 22 | 52.944 | 4.43 | 1.49700 | 81.5 |
| 23 | −808.213 | (Variable) | | |
| 24 | 3,196.697 | 1.05 | 1.84666 | 23.9 |
| 25 | 30.218 | 3.71 | 1.92286 | 18.9 |
| 26 | 88.533 | 5.34 | | |
| 27 | −47.638 | 1.00 | 1.85478 | 24.8 |
| 28 | −160.144 | (Variable) | | |
| 29 | 36.415 | 9.94 | 1.43875 | 94.7 |
| 30 | −61.745 | 0.15 | | |
| 31 | 47.368 | 6.23 | 1.49700 | 81.5 |
| 32 | −170.022 | 1.80 | 1.85400 | 40.4 |
| 33* | −2,547.030 | (Variable) | | |
| 34 | 68.859 | 2.37 | 1.92286 | 18.9 |
| 35 | 154.788 | 1.10 | 1.85025 | 30.1 |
| 36 | 36.551 | (Variable) | | |
| 37* | −55.279 | 1.70 | 1.58313 | 59.4 |
| 38* | −10,000.000 | 0.15 | | |
| 39 | 156.816 | 2.41 | 1.95375 | 32.3 |
| 40 | −3,305.232 | (Variable) | | |
| Image plane | ∞ | | | |
| Aspherical surface data | | | | |
| Fifteenth surface | | | | |

K = 0.00000e+000    A4 = 1.10571e−007    A6 = 8.02539e−010    A8 = −4.18118e−012
A10 = 1.41871e−014    A12 = −1.47780e−017

Thirty-third surface

K = 0.00000e+000    A4 = 7.21834e−006    A6 = 4.46302e−010    A8 = 2.21450e−011
A10 = −7.29798e−014    A12 = 1.34056e−016

Thirty-seventh surface

K = 0.00000e+000    A4 = −1.63900e−005    A6 = 2.32428e−008    A8 = 8.32991e−011
A10 = −5.13296e−013    A12 = 9.55109e−016

-continued

| Unit: mm |
| --- |
| Thirty-eighth surface |

K = 0.00000e+000   A4 = −1.59083e−005   A6 = 2.55719e−008   A8 = 4.90273e−011
A10 = −3.46294e−013   A12 = 5.72243e−016

Various data
Zoom ratio 4.71

|  | Wide angle | Intermediate | Telephoto |
| --- | --- | --- | --- |
| Focal length | 24.72 | 56.90 | 116.40 |
| F-number | 2.91 | 2.91 | 2.91 |
| Half angle of view (degrees) | 36.81 | 20.82 | 10.53 |
| Image height | 18.50 | 21.64 | 21.64 |
| Total lens length | 213.45 | 213.45 | 213.45 |
| BF | 13.37 | 31.48 | 22.23 |
| d7 | 0.89 | 16.60 | 32.30 |
| d15 | 52.53 | 22.62 | 1.70 |
| d23 | 1.12 | 4.50 | 8.68 |
| d28 | 17.21 | 11.45 | 5.51 |
| d33 | 5.52 | 1.89 | 3.97 |
| d36 | 10.88 | 12.99 | 27.14 |
| d40 | 13.37 | 31.48 | 22.23 |

Lens unit data

| Unit | First surface | Focal length |
| --- | --- | --- |
| 1 | 1 | 89.80 |
| 2 | 8 | −26.68 |
| 3 | 16 | 41.43 |
| 4 | 24 | −48.66 |
| 5 | 29 | 37.40 |
| 6 | 34 | −102.47 |
| 7 | 37 | −247.79 |

Numerical Example 2

| Unit: mm |
| --- |
| Surface data |

| Surface number | r | d | nd | vd |
| --- | --- | --- | --- | --- |
| 1 | −536.628 | 2.50 | 1.90366 | 31.3 |
| 2 | 43.687 | 15.85 | 1.59349 | 67.0 |
| 3 | 1,251.007 | 0.15 | | |
| 4 | 133.159 | 5.20 | 1.85478 | 24.8 |
| 5 | −3,274.077 | 0.15 | | |
| 6 | 70.916 | 5.75 | 1.72916 | 54.7 |
| 7 | 274.015 | 0.15 | | |
| 8 | 48.645 | 10.15 | 1.72916 | 54.7 |
| 9 | −1,552.696 | (Variable) | | |
| 10 | −419.683 | 1.55 | 1.95375 | 32.3 |
| 11 | 24.060 | 7.43 | | |
| 12 | −85.124 | 1.30 | 1.90043 | 37.4 |
| 13 | 40.686 | 10.52 | 1.80810 | 22.8 |
| 14 | −42.061 | 0.11 | | |
| 15 | −45.127 | 1.30 | 1.72916 | 54.7 |
| 16 | −1,163.193 | 2.98 | 1.85400 | 40.4 |
| 17* | −447.305 | (Variable) | | |
| 18 (Stop) | ∞ | 0.40 | | |
| 19 | 89.837 | 7.21 | 2.05090 | 26.9 |
| 20 | −109.514 | 0.15 | | |
| 21 | 467.920 | 4.84 | 1.49700 | 81.5 |
| 22 | −103.489 | 1.40 | 1.89286 | 20.4 |
| 23 | 1,008.286 | 1.21 | | |
| 24 | 189.964 | 5.99 | 1.43875 | 94.7 |
| 25 | −117.052 | (Variable) | | |
| 26 | −340.950 | 1.05 | 1.84666 | 23.9 |
| 27 | 94.078 | 2.30 | 1.92286 | 18.9 |
| 28 | 264.828 | 6.51 | | |
| 29 | −34.781 | 1.00 | 1.85478 | 24.8 |

-continued

| Unit: mm | | | | |
|---|---|---|---|---|
| 30 | −87.969 | (Variable) | | |
| 31 | 61.684 | 11.80 | 1.43875 | 94.7 |
| 32 | −52.128 | 0.15 | | |
| 33 | 60.182 | 13.59 | 1.49700 | 81.5 |
| 34 | −36.766 | 1.80 | 1.85400 | 40.4 |
| 35* | −82.610 | (Variable) | | |
| 36 | 97.730 | 1.00 | 1.85478 | 24.8 |
| 37 | 48.957 | (Variable) | | |
| 38* | −39.017 | 1.70 | 1.85400 | 40.4 |
| 39* | −264.040 | 2.34 | | |
| 40 | −58.047 | 4.95 | 1.92286 | 20.9 |
| 41 | −31.487 | (Variable) | | |
| Image plane | ∞ | | | |

Aspherical surface data

Seventeenth surface $K = 0.00000e+000$  $A4 = -3.14899e-006$  $A6 = -2.40032e-009$  $A8 = -5.67768e-012$
$A10 = 1.22341e-014$  $A12 = -2.60988e-017$ Thirty-fifth surface $K = 0.00000e+000$  $A4 = 2.04538e-006$  $A6 = -8.93361e-010$  $A8 = -1.98997e-012$
$A10 = 3.99705e-015$  $A12 = -3.30689e-018$ Thirty-eighth surface $K = 0.00000e+000$  $A4 = -4.90183e-006$  $A6 = 8.63226e-009$  $A8 = -1.02883e-010$
$A10 = 3.50247e-013$  $A12 = -3.91930e-016$ Thirty-ninth surface $K = 0.00000e+000$  $A4 = -2.68152e-006$  $A6 = 4.04002e-009$  $A8 = -3.68066e-011$
$A10 = 1.25329e-013$  $A12 = -1.29943e-016$ Various data
Zoom ratio 4.00

| | Wide angle | Intermediate | Telephoto |
|---|---|---|---|
| Focal length | 35.00 | 72.14 | 139.97 |
| F-number | 2.91 | 2.91 | 2.91 |
| Half angle of view (degrees) | 27.86 | 16.69 | 8.79 |
| Image height | 18.50 | 21.64 | 21.64 |
| Total lens length | 249.34 | 249.34 | 249.34 |
| BF | 7.99 | 37.14 | 63.00 |
| d9 | 0.84 | 6.00 | 11.16 |
| d17 | 44.10 | 18.67 | 1.69 |
| d25 | 0.98 | 3.38 | 0.40 |
| d30 | 30.19 | 24.72 | 15.82 |
| d35 | 16.26 | 9.10 | 1.50 |
| d37 | 14.47 | 15.83 | 21.28 |
| d41 | 7.99 | 37.14 | 63.00 |

Lens unit data

| Unit | First surface | Focal length |
|---|---|---|
| 1 | 1 | 43.78 |
| 2 | 10 | −19.79 |
| 3 | 18 | 44.25 |
| 4 | 26 | −48.98 |
| 5 | 31 | 43.29 |
| 6 | 36 | −115.86 |
| 7 | 38 | −607.98 |

Numerical Example 3

| | Unit: mm | | | |
|---|---|---|---|---|
| | Surface data | | | |
| Surface number | r | d | nd | vd |
| 1 | 3,153.722 | 2.50 | 1.95375 | 32.3 |
| 2 | 93.521 | 11.80 | 1.49700 | 81.5 |
| 3 | −430.783 | 0.15 | | |
| 4 | 172.089 | 3.95 | 1.72916 | 54.7 |
| 5 | 562.272 | 0.15 | | |
| 6 | 80.780 | 8.14 | 1.72916 | 54.7 |
| 7 | 1,264.217 | (Variable) | | |
| 8 | −67,456.288 | 1.55 | 1.88300 | 40.8 |
| 9 | 32.190 | 8.49 | | |
| 10 | −76.302 | 1.30 | 1.90043 | 37.4 |
| 11 | 54.526 | 9.65 | 1.78472 | 25.7 |
| 12 | −54.404 | 0.15 | | |
| 13 | −53.636 | 1.10 | 1.59522 | 67.7 |
| 14 | 48.227 | 5.17 | 1.85400 | 40.4 |
| 15* | 1,395.993 | (Variable) | | |
| 16 (Stop) | ∞ | 0.40 | | |
| 17 | 77.911 | 5.69 | 2.05090 | 26.9 |
| 18 | −144.006 | 0.15 | | |
| 19 | 58.232 | 6.70 | 1.49700 | 81.5 |
| 20 | −106.339 | 1.40 | 1.89286 | 20.4 |
| 21 | 82.701 | 1.20 | | |
| 22 | 54.603 | 3.73 | 1.49700 | 81.5 |
| 23 | 364.107 | (Variable) | | |
| 24 | 965.633 | 1.05 | 1.84666 | 23.9 |
| 25 | 29.517 | 3.74 | 1.92286 | 18.9 |
| 26 | 83.118 | 5.19 | | |
| 27 | −54.363 | 1.00 | 1.85478 | 24.8 |
| 28 | −388.840 | (Variable) | | |
| 29 | 37.200 | 10.36 | 1.43875 | 94.7 |
| 30 | −58.460 | 0.15 | | |
| 31 | 44.549 | 5.63 | 1.49700 | 81.5 |
| 32 | 3,481.091 | 1.80 | 1.85400 | 40.4 |
| 33* | 5,810.376 | (Variable) | | |
| 34 | 92.075 | 2.96 | 1.92286 | 18.9 |
| 35 | −730.810 | 1.10 | 1.85025 | 30.1 |
| 36 | 33.451 | (Variable) | | |
| 37* | −117.604 | 1.70 | 1.58313 | 59.4 |
| 38* | −10,000.000 | 0.15 | | |
| 39 | 145.141 | 2.03 | 1.95375 | 32.3 |
| 40 | 467.386 | (Variable) | | |
| Image plane | ∞ | | | |

Aspherical surface data

Fifteenth surface

K = 0.00000e+000  A4 = −1.44691e−007  A6 = −9.72085e−010  A8 = 6.83241e−012
A10 = −2.15937e−014  A12 = 2.61074e−017

Thirty-third surface

K = 0.00000e+000  A4 = 7.23723e−006  A6 = 6.60332e−010  A8 = 2.32070e−011
A10 = −8.18320e−014  A12 = 1.50647e−016

Thirty-seventh surface

K = 0.00000e+000  A4 = −3.19909e−005  A6 = 4.42191e−008  A8 = −6.13800e−011
A10 = −1.11980e−013  A12 = 4.26889e−016

Thirty-eighth surface

K = 0.00000e+000  A4 = −3.16995e−005  A6 = 5.06780e−008  A8 = −9.41436e−011
A10 = 3.89406e−014  A12 = 1.19325e−016

Various data
Zoom ratio 4.71

| | Wide angle | Intermediate | Telephoto |
|---|---|---|---|
| Focal length | 24.72 | 55.65 | 116.40 |
| F-number | 2.91 | 2.91 | 2.91 |
| Half angle of view (degrees) | 36.81 | 21.25 | 10.53 |
| Image height | 18.50 | 21.64 | 21.64 |
| Total lens length | 223.45 | 223.45 | 223.45 |
| BF | 17.99 | 36.19 | 23.88 |

-continued

| Unit: mm | | | |
|---|---|---|---|
| d7 | 0.90 | 22.68 | 44.45 |
| d15 | 60.24 | 26.83 | 1.70 |
| d23 | 1.54 | 4.25 | 9.38 |
| d28 | 18.49 | 10.62 | 4.01 |
| d33 | 4.06 | 1.84 | 8.69 |
| d36 | 10.00 | 10.81 | 21.10 |
| d40 | 17.99 | 36.19 | 23.88 |

| Lens unit data | | |
|---|---|---|
| Unit | First surface | Focal length |
| 1 | 1 | 118.68 |
| 2 | 8 | −30.80 |
| 3 | 16 | 43.38 |
| 4 | 24 | −46.52 |
| 5 | 29 | 34.71 |
| 6 | 34 | −67.79 |
| 7 | 37 | −2958.06 |

Numerical Example 4

| Unit: mm | | | |
|---|---|---|---|
| Surface data | | | |
| Surface number | r | d | nd | vd |
| 1 | ∞ | 2.50 | 1.95539 | 33.6 |
| 2 | 83.591 | 13.24 | 1.49700 | 81.5 |
| 3 | −290.774 | 0.15 | | |
| 4 | 133.425 | 4.94 | 1.72916 | 54.7 |
| 5 | 479.096 | 0.15 | | |
| 6 | 72.208 | 9.83 | 1.72916 | 54.7 |
| 7 | 1,473.420 | (Variable) | | |
| 8 | −13,217.526 | 1.55 | 1.88300 | 40.8 |
| 9 | 31.703 | 7.97 | | |
| 10 | −77.444 | 1.30 | 1.90043 | 37.4 |
| 11 | 45.413 | 8.36 | 1.78472 | 25.7 |
| 12 | −54.533 | 0.43 | | |
| 13 | −48.894 | 1.10 | 1.59522 | 67.7 |
| 14 | 43.257 | 6.49 | 1.85400 | 40.4 |
| 15* | 571.432 | (Variable) | | |
| 16 (Stop) | ∞ | 0.40 | | |
| 17 | 107.700 | 5.64 | 2.05090 | 26.9 |
| 18 | −136.091 | 0.15 | | |
| 19 | 75.219 | 6.59 | 1.49700 | 81.5 |
| 20 | −123.715 | 1.40 | 1.89286 | 20.4 |
| 21 | 157.779 | 0.15 | | |
| 22 | 68.160 | 4.32 | 1.49700 | 81.5 |
| 23 | 488.885 | (Variable) | | |
| 24 | −589.883 | 1.05 | 1.84666 | 23.9 |
| 25 | 32.574 | 5.81 | 1.92286 | 18.9 |
| 26 | 104.883 | 6.67 | | |
| 27 | −44.004 | 1.00 | 1.85478 | 24.8 |
| 28 | −116.488 | (Variable) | | |
| 29 | 46.566 | 1.30 | 1.78508 | 45.7 |
| 30 | 32.144 | 14.20 | 1.43875 | 94.7 |
| 31 | −55.505 | 0.15 | | |
| 32 | 33.936 | 11.91 | 1.49700 | 81.5 |
| 33 | −234.767 | 0.15 | | |
| 34 | 53.577 | 3.00 | 1.85400 | 40.4 |
| 35* | 67.167 | (Variable) | | |
| 36 | 60.544 | 1.36 | 1.92286 | 18.9 |
| 37 | 63.718 | 1.10 | 1.85025 | 30.1 |
| 38 | 28.266 | (Variable) | | |

| | Unit: mm | | | |
|---|---|---|---|---|
| 39* | −213.483 | 2.00 | 1.58235 | 43.1 |
| 40* | 44.513 | 0.15 | | |
| 41 | 84.994 | 4.00 | 1.92273 | 20.9 |
| 42 | −387.052 | (Variable) | | |
| Image plane | ∞ | | | |

Aspherical surface data

Fifteenth surface

K = 0.00000e+000  A4 = −4.40430e−007  A6 = 6.64297e−010  A8 = −3.34535e−012
A10 = 8.97780e−015  A12 = −8.07919e−018

Thirty-fifth surface

K = 0.00000e+000  A4 = 6.06930e−006  A6 = 8.38783e−010  A8 = 1.83554e−011
A10 = −3.12280e−014  A12 = 3.59249e−017

Thirty-ninth surface

K = 0.00000e+000  A4 = −4.91098e−005  A6 = 1.96840e−007  A8 = −4.97273e−010
A10 = 7.65556e−013  A12 = −6.60134e−016

Fortieth surface

K = 0.00000e+000  A4 = −5.00420e−005  A6 = 2.02969e−007  A8 = −5.35828e−010
A10 = 7.94074e−013  A12 = −5.43704e−016

Various data
Zoom ratio 4.20

| | Wide angle | Intermediate | Telephoto |
|---|---|---|---|
| Focal length | 25.00 | 52.97 | 104.99 |
| F-number | 2.20 | 2.20 | 2.20 |
| Half angle of view (degrees) | 36.50 | 22.22 | 11.64 |
| Image height | 18.50 | 21.64 | 21.64 |
| Total lens length | 223.46 | 223.46 | 223.46 |
| BF | 13.36 | 27.12 | 27.27 |
| d7 | 0.86 | 17.35 | 33.84 |
| d15 | 45.74 | 20.92 | 1.69 |
| d23 | 2.00 | 5.91 | 6.97 |
| d28 | 15.42 | 7.29 | 1.39 |
| d35 | 3.63 | 1.80 | 3.41 |
| d38 | 11.94 | 12.56 | 18.38 |
| d42 | 13.36 | 27.12 | 27.27 |

Lens unit data

| Unit | First surface | Focal length |
|---|---|---|
| 1 | 1 | 95.22 |
| 2 | 8 | −28.06 |
| 3 | 16 | 46.54 |
| 4 | 24 | −48.87 |
| 5 | 29 | 31.58 |
| 6 | 36 | −64.98 |
| 7 | 39 | −397.80 |

Numerical Example 5

| Unit: mm | | | | |
|---|---|---|---|---|
| Surface data | | | | |
| Surface number | r | d | nd | νd |
| 1 | −894.264 | 2.50 | 1.95375 | 32.3 |
| 2 | 80.018 | 13.70 | 1.49700 | 81.5 |
| 3 | −272.610 | 0.15 | | |
| 4 | 117.014 | 6.17 | 1.72916 | 54.7 |
| 5 | 1,470.547 | 0.15 | | |
| 6 | 74.350 | 7.79 | 1.72916 | 54.7 |
| 7 | 1,699.568 | (Variable) | | |
| 8 | 2,149.506 | 1.55 | 1.88300 | 40.8 |
| 9 | 30.292 | 8.49 | | |

-continued

| Unit: mm | | | | |
|---|---|---|---|---|
| 10 | −68.711 | 1.30 | 1.90043 | 37.4 |
| 11 | 42.853 | 9.59 | 1.78472 | 25.7 |
| 12 | −43.840 | 0.13 | | |
| 13 | −43.409 | 1.10 | 1.59522 | 67.7 |
| 14 | 45.614 | 5.07 | 1.85400 | 40.4 |
| 15* | 232.816 | (Variable) | | |
| 16 (Stop) | ∞ | 0.40 | | |
| 17 | 80.913 | 5.53 | 2.05090 | 26.9 |
| 18 | −150.306 | 0.15 | | |
| 19 | 78.592 | 6.84 | 1.49700 | 81.5 |
| 20 | −98.648 | 1.40 | 1.89286 | 20.4 |
| 21 | 109.625 | 0.19 | | |
| 22 | 54.438 | 5.19 | 1.49700 | 81.5 |
| 23 | −859.630 | (Variable) | | |
| 24 | 3,145.861 | 1.05 | 1.84666 | 23.9 |
| 25 | 30.943 | 4.40 | 1.92286 | 18.9 |
| 26 | 85.172 | 4.65 | | |
| 27 | −57.849 | 1.00 | 1.85478 | 24.8 |
| 28 | −206.274 | (Variable) | | |
| 29 | 36.808 | 10.70 | 1.43875 | 94.7 |
| 30 | −67.682 | 0.15 | | |
| 31 | 62.075 | 6.40 | 1.49700 | 81.5 |
| 32 | −122.740 | 1.80 | 1.85400 | 40.4 |
| 33* | 417.392 | (Variable) | | |
| 34 | 75.838 | 2.52 | 1.92286 | 18.9 |
| 35 | 241.097 | 1.10 | 1.85025 | 30.1 |
| 36 | 42.156 | (Variable) | | |
| 37* | −180.229 | 2.00 | 1.58313 | 59.4 |
| 38* | −10,000.000 | 0.15 | | |
| 39 | −1,586.865 | 2.27 | 1.95375 | 32.3 |
| 40 | −370.600 | (Variable) | | |
| Image plane | ∞ | | | |

| Aspherical surface data |
|---|
| Fifteenth surface |

$K = 0.00000e+000$   $A4 = -3.44694e-007$   $A6 = -2.29825e-010$   $A8 = 2.79137e-013$
$A10 = 2.28176e-015$   $A12 = -5.12675e-018$

Thirty-third surface $K = 0.00000e+000$   $A4 = 6.19923e-006$   $A6 = 1.68545e-009$   $A8 = 1.92884e-011$
$A10 = -6.37363e-014$   $A12 = 1.13911e-016$ Thirty-seventh surface $K = 0.00000e+000$   $A4 = -2.80107e-005$   $A6 = -3.42202e-009$   $A8 = 1.94181e-010$
$A10 = -7.19424e-013$   $A12 = 8.73849e-016$ Thirty-eighth surface $K = 0.00000e+000$   $A4 = -2.83704e-005$   $A6 = 6.20607e-009$   $A8 = 1.36289e-010$
$A10 = -5.26280e-013$   $A12 = 6.12837e-016$

| Various data Zoom ratio 6.67 | | | |
|---|---|---|---|
| | Wide angle | Intermediate | Telephoto |
| Focal length | 24.72 | 62.83 | 164.99 |
| F-number | 2.91 | 2.91 | 4.12 |
| Half angle of view (degrees) | 36.81 | 19.00 | 7.47 |
| Image height | 18.50 | 21.64 | 21.64 |
| Total lens length | 235.49 | 235.49 | 235.49 |
| BF | 14.45 | 37.04 | 15.61 |
| d7 | 0.89 | 20.43 | 39.98 |
| d15 | 60.89 | 27.35 | 1.69 |
| d23 | 1.07 | 4.10 | 9.69 |
| d28 | 23.22 | 13.33 | 3.62 |
| d33 | 7.91 | 3.47 | 5.22 |
| d36 | 11.50 | 14.19 | 44.12 |
| d40 | 14.45 | 37.04 | 15.61 |

| Lens unit data | | |
|---|---|---|
| Unit | First surface | Focal length |
| 1 | 1 | 89.26 |
| 2 | 8 | −25.46 |

-continued

| Unit: mm | | |
|---|---|---|
| 3 | 16 | 42.28 |
| 4 | 24 | −52.79 |
| 5 | 29 | 47.22 |
| 6 | 34 | −127.67 |
| 7 | 37 | −844.49 |

TABLE 1

| | Conditional Expression | Example 1 | Example 2 | Example 3 | Example 4 | Example 5 |
|---|---|---|---|---|---|---|
| Conditional Expression (1) | 0.18 < fw/f1 < 5.0 | 0.275 | 0.800 | 0.208 | 0.263 | 0.277 |
| Conditional Expression (2) | 8.2 < TTD/skw < 100.0 | 15.962 | 31.220 | 12.419 | 16.727 | 16.301 |
| Conditional Expression (3) | 0.5 < f1min/f1 < 50 | 2.275 | 3.422 | 2.854 | 2.647 | 1.950 |
| Conditional Expression (4) | 0.05 < TD1/TTD < 0.28 | 0.135 | 0.160 | 0.119 | 0.138 | 0.129 |
| Conditional Expression (5) | −5 < m3/f3 < −0.05 | −0.252 | −0.739 | −0.244 | −0.131 | −0.296 |
| Conditional Expression (6) | 2 < ft/fw < 15 | 4.433 | 3.999 | 4.709 | 4.200 | 6.674 |
| Conditional Expression (7) | −20 < POw/fw < −2 | −3.794 | −8.113 | −4.516 | −6.081 | −4.513 |
| Conditional Expression (8) | −0.9 < f2/ft < −0.05 | −0.243 | −0.141 | −0.265 | −0.267 | −0.154 |
| Conditional Expression (9) | −8 < f1/f2 < −1 | −3.366 | −2.212 | −3.853 | −3.393 | −3.505 |
| Conditional Expression (10) | 0.04 < fw × tanω/TTD < 0.2 | 0.087 | 0.074 | 0.083 | 0.083 | 0.079 |

TABLE 2

| Parameter | Example 1 | Example 2 | Example 3 | Example 4 | Example 5 |
|---|---|---|---|---|---|
| fw | 24.720 | 35.001 | 24.720 | 25.001 | 24.721 |
| f1 | 89.798 | 43.777 | 118.675 | 95.221 | 89.256 |
| TTD | 213.451 | 249.340 | 223.451 | 223.460 | 235.492 |
| skw | 13.372 | 7.987 | 17.993 | 13.359 | 14.447 |
| f1min | 204.273 | 149.799 | 338.659 | 252.094 | 174.018 |
| TD1 | 28.835 | 39.901 | 26.694 | 30.809 | 30.455 |
| m3 | −12.994 | −32.682 | −10.587 | −6.105 | −12.533 |
| f3 | 51.515 | 44.253 | 43.385 | 46.538 | 42.284 |
| ft | 109.582 | 139.971 | 116.397 | 104.991 | 164.993 |
| tanω | 0.748 | 0.529 | 0.748 | 0.740 | 0.748 |
| POw | −93.782 | −283.946 | −111.638 | −152.020 | −111.572 |
| f2 | −26.681 | −19.794 | −30.798 | −28.062 | −25.465 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030180, filed Feb. 22, 2019, which is hereby incorporated by reference herein in its entirety.

What is claimed is:

1. A zoom lens consisting of, in order from an object side to an image side:
   a first lens unit having a positive refractive power;
   a second lens unit having a negative refractive power;
   a third lens unit having a positive refractive power; and
   a rear lens group including a plurality of lens units,
   wherein an interval between each pair of adjacent lens units is changed during zooming,
   wherein the first lens unit is configured not to move during zooming,
   wherein the third lens unit is configured to move toward the object side during zooming from a wide angle end to a telephoto end,
   wherein the first lens unit includes three or more positive lenses, and
   wherein the following conditional expressions are satisfied:

$$0.18 < fw/f1 < 5.00;$$

$$8.2 < TTD/skw < 100.0;$$

$$-0.9 < f2/ft < -0.12; \text{ and}$$

$$0.5 < f1\,min/f1 < 50.0,$$

where fw represents a focal length of the zoom lens at the wide angle end, f1 represents a focal length of the first lens unit, TTD represents a distance from a lens surface closest to the object side to an image plane, skw represents a back focus at the wide angle end, f1 min represents a focal length of a positive lens having a smallest refractive power among the three or more positive lenses included in the first lens unit, ft represents a focal length of the zoom lens at the telephoto end and f2 represents a focal length of the second lens unit.

2. The zoom lens according to claim 1, wherein the following conditional expression is satisfied:

$$0.05 < TD1/TTD < 0.28,$$

where TD1 represents a length on an optical axis from a lens surface closest to the object side of the first lens unit to a lens surface closest to the image side of the first lens unit.

3. The zoom lens according to claim 1, wherein the following conditional expression is satisfied:

$$-5.00 < m3/f3 < -0.05,$$

where m3 represents a movement amount of the third lens unit during zooming from the wide angle end to the telephoto end, and f3 represents a focal length of the third lens unit.

4. The zoom lens according to claim 1, wherein the following conditional expression is satisfied:

$$2 < ft/fw < 15.$$

5. The zoom lens according to claim 1, wherein the following conditional expression is satisfied:

$$-20 < POw/fw < -2,$$

where POw represents an exit pupil distance of the zoom lens at the wide angle end.

6. The zoom lens according to claim 1, wherein the following conditional expression is satisfied:

$$-8 < f1/f2 < -1.$$

7. The zoom lens according to claim 1, wherein a number of the three or more positive lenses included in the first lens unit is equal to or smaller than four.

8. The zoom lens according to claim 1, wherein the first lens unit consists of, in order from the object side to the image side, a negative lens, a positive lens, a positive lens, and a positive lens.

9. The zoom lens according to claim 1, wherein the rear lens group includes, in order from the object side to the image side, a fourth lens unit having a negative refractive power and a fifth lens unit having a positive refractive power.

10. The zoom lens according to claim 1, wherein the rear lens group consists of, in order from the object side to the image side, a fourth lens unit having a negative refractive power, a fifth lens unit having a positive refractive power, a sixth lens unit having a negative refractive power, and a seventh lens unit having a negative refractive power.

11. The zoom lens according to claim 1, wherein a lens unit closest to an object in the rear lens group includes a subunit configured to move in a direction having a component perpendicular to an optical axis when correcting image blur.

12. The zoom lens according to claim 1, wherein a lens unit arranged at the image side of a lens unit closest to an object in the rear lens group is configured to move during focusing.

13. An image pickup apparatus comprising:
the zoom lens of claim 1; and
an image pickup element configured to receive light of an image formed by the zoom lens.

14. The image pickup apparatus according to claim 13, wherein the following conditional expression is satisfied:

$$0.04 < fw \times \tan \omega / TTD < 0.20,$$

where $\omega$ represents a half angle of view at the wide angle end.

* * * * *